United States Patent [19]

Hasha

[11] 4,132,111

[45] Jan. 2, 1979

[54] LEAK TESTING METHOD AND APPARATUS FOR TUBULAR MEMBERS PACKER MEANS THEREFOR

[76] Inventor: Malvern M. Hasha, 1527 Castlerock, Houston, Tex. 77090

[21] Appl. No.: 506,547

[22] Filed: Sep. 16, 1974

Related U.S. Application Data

[63] Continuation-in-part of Ser. No. 467,133, May 6, 1974, abandoned.

[51] Int. Cl.² ............... G01M 3/28; E21B 33/126
[52] U.S. Cl. ............................ 73/46; 277/188 A
[58] Field of Search ............ 73/40.5 R, 46, 49.1, 73/49.5, 49.8; 138/89, 90; 277/164, 206, 79, 188 A

[56] References Cited

U.S. PATENT DOCUMENTS

| | | | |
|---|---|---|---|
| 1,612,039 | 12/1926 | Miller | 277/188 A X |
| 2,587,192 | 2/1952 | Meyer | 73/46 |
| 2,663,183 | 12/1953 | Huhn | 73/46 |
| 2,695,632 | 11/1954 | Brock | 138/90 |
| 2,732,268 | 1/1956 | Ouval | 277/79 X |
| 2,761,311 | 9/1956 | Baker | 73/46 |
| 2,780,092 | 2/1957 | Govan | 73/49.5 |
| 2,957,717 | 10/1960 | Bram | 277/164 X |
| 3,034,339 | 5/1962 | Gawlik | 73/46 |
| 3,177,703 | 4/1965 | Waters et al. | 73/46 X |
| 3,186,702 | 6/1965 | Taylor | 277/188 A X |
| 3,371,521 | 3/1968 | Hauk | 73/46 |
| 3,490,525 | 1/1970 | Nettles | 73/46 X |
| 3,588,130 | 6/1971 | Fowler et al. | 277/166 X |
| 3,647,226 | 3/1972 | Middelkoop et al. | 277/206 X |
| 3,653,254 | 4/1972 | Simon | 73/46 |
| 3,897,071 | 7/1975 | Le Rouax | 277/188 A X |

*Primary Examiner*—Richard C. Queisser
*Assistant Examiner*—John S. Appleman

[57] ABSTRACT

A body having a longitudinal opening therethrough is provided with longitudinally spaced, annular seal means. The body is provided with passage means for conducting fluid to move the seal means radially of the body opening to seal against tubular members in the body opening.

The tubular members are connected together by suitable means such as a coupling, weld, or other arrangement prior to positioning the connection between the seal means and after the seal means has sealed off the connection therebetween, the body includes additional passage means for conducting fluid pressure to increase the fluid pressure externally of the connection to a pressure significantly greater than the internal pressure to externally test the connection by instrumentally or visually detecting any resultant inflow of the pressurized external fluid.

Where the method of the present invention is employed for leak testing a thread-connected, multiple seal pipe joint having at least one internal and at least one external sealing arrangement, the connection between the tubular members may be only partially made up to a predetermined condition at which a primary or initial internal seal is established in the connection without engaging the external seal. After the joint has been externally tested in this condition, the test seals may be withdrawn from the tubular member and the connection completed to full make-up torque, and the joint again externally sealed and fluid pressure applied to externally test the connection.

In one embodiment the body of the present invention is provided with additional annular seal means intermediate said first and second spaced seal means and additional passage means is provided for communicating fluid to move said additional annular seal means radially into engagement with the connection to isolate each end thereof. The body includes still additional passage means for communicating with the connection and isolated connection end on each side of the additional annular seal means whereby each end of the connection may be separately externally tested by fluid pressure for leaks by detecting any resultant inflow of the pressurized external fluid at either connection end.

In another embodiment the arrangement may be employed to test tubular members at a mill for quality control, or tested on location prior to use.

The annular seal means preferably includes an elastomer body and back up means carried thereby to aid in inhibiting extrusion of the elastomer when fluid pressure is applied to the chamber between the seals to externally test the connection.

6 Claims, 17 Drawing Figures

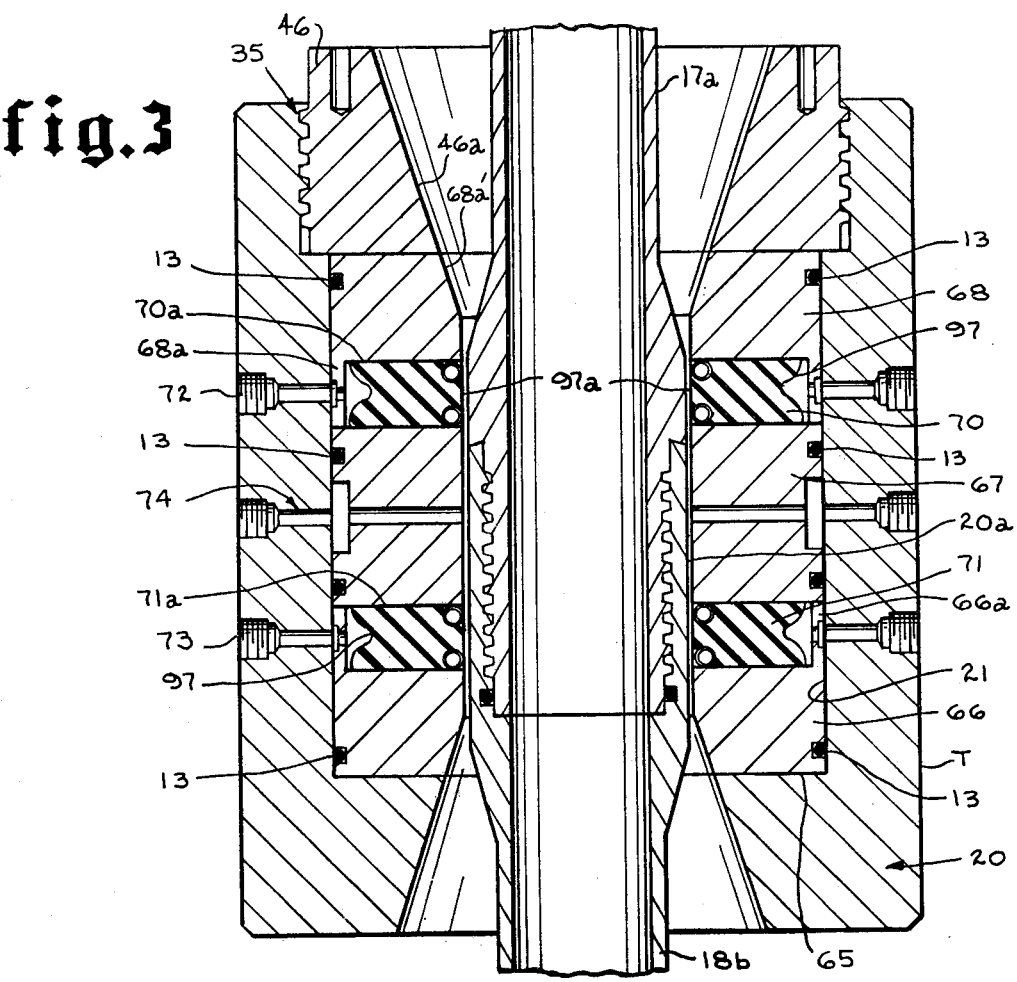
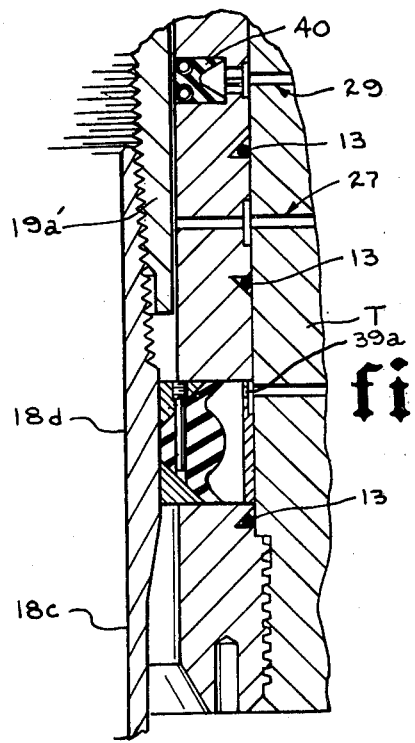
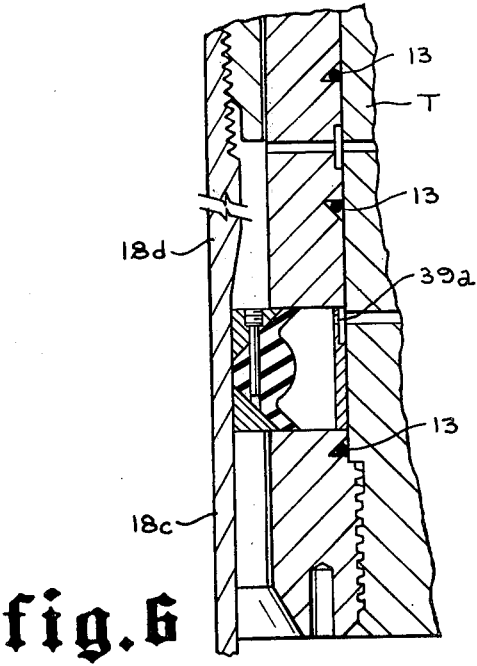

4,132,111

LEAK TESTING METHOD AND APPARATUS FOR TUBULAR MEMBERS PACKER MEANS THEREFOR

CROSS REFERENCE TO RELATED APPLICATION

This is a continuation in part of my prior copending application Ser. No. 467,133 filed May 6, 1974 for "Leak Testing Method And Apparatus For Tubular Members And Packer Means Therefor", abandoned.

SUMMARY OF THE INVENTION

Various types of external pipe testers have been provided such as that shown in U.S. Pat. Nos. 3,371,521; 3,034,339, 2,587,192 and 2,761,311.

In those devices which are split to wrap around the tubular members to perform an external test, the structure and arrangement of such external testers is bulky and valuable time may be lost in positioning the device about the pipe and the connection to perform the test and thereafter removing the device from the pipe so that the tubular members may be moved relative to the tester. This is particularly true where the device is employed in running tubulars such as production tubing, surface pipe or casing in an oil or gas well. In some instances, it is desirable to complete the test as quickly as possible and with a minimum of time lost in maintaining the pipe stationary to inhibit sticking of the pipe, or to inhibit other problems that may be encountered to those skilled in the art.

In those devices heretofore contemplated for permanent positioning about tubular members during external testing thereof, the longitudinal extent of the devices and the manner in which the seals are actuated not only may render them difficult for use in that the position of the tongs relative to such longer bodies makes it awkward and difficult for the tongs to be readily manipulated by the tong operator but the volume of fluid externally of the connection may reduce the sensitivity and accuracy of the test. Such devices also do not necessarily provide a satisfactory construction for performing an external test on tubular members, particularly where the test is performed as the tubular members are being run into an oil or gas well, so as to form the seal externally about the connection, perform the test and then release the seals so that the pipe may be moved therethrough with a minimum of time lost and a minimum of effort.

The present invention is directed to a method and structural arrangement of an external tester which may be maintained and positioned about the pipe when it is being run in or removed from an oil, gas or other type well to enable a seal to be formed around a connection to seal the connection off and externally test it for leaks, and thereafter disengage the seal from the tubular member to permit the tubular member to be moved longitudinally through the test unit and into or out of the well bore.

Yet a further object of the present invention is to provide an external tester for testing connections between tubular members including a body having an opening extending longitudinally therethrough, such body having longitudinally spaced annular seal means therein with passage means in the body for conducting fluid to move the seal means radially away from the body and into the opening to seal about the tubular members and isolate the tubular member connection in a chamber between the seal means and additional fluid passage means for conducting fluid to the chamber between the seal members to externally test the connection between the tubular members for leaks.

Yet a further object is to apply fluid pressure directly against annular seals to move them radially into sealing engagement with tubular members to seal off a connection between the tubular members even though the tubular members may be out-of-round, or may be slightly oversize or undersize relative to the standard normal diameter of the tubular members.

Yet a further object of the present invention is to provide an external tester for testing connections between tubular members including a body having an opening extending longitudinally therethrough, such body having longitudinally spaced annular seal means therein with passage means in the body for conducting fluid to move the seal means radially of the body to seal about the tubular members and isolate the tubular member connection in a chamber between the seal means; the chamber being only slightly larger than the connection to form a chamber of minimum volume in the body, and additional fluid passage means for conducting fluid to the chamber between the seal members to externally test the connection between the tubular members for leaks. Additional annular seal means are carried by the body between the spaced seal means with passage means for conducting fluid pressure to move the additional seal means radially of the body and into the opening to seal against the connection and isolate one end of the connection from the other end with additional passage means in the body for communicating with the isolated ends of the connection for selectively externally testing the ends of the connection for leaks.

Still another object of the invention is to provide an external leak tester for tubular members which are connected by a connection including a body having an opening extending longitudinally therethrough for receiving the tubular members and connection therein, there being spacer means mounted in the body opening forming annular recesses spaced longitudinally within the body opening and annular seal means mounted in the recesses. Fluid passage means are provided in the body for communicating with the seal means to urge them into sealing engagement in the recesses and simultaneously radially of the body opening for sealably engaging the connection on the tubular members therebetween. The seal means comprises an annular elastomer body having surfaces extending toward the tubular members and back up means on the surfaces for aiding in inhibiting extrusion of the elastomer when it is urged radially of the body opening to sealingly engage the tubular members.

Another object of the invention is to provide a method for externally testing a connection between tubular members by positioning the connection between spaced annular seal means and applying fluid pressure to the seal means to move the spaced seal means radially to seal off the connection and form a chamber between the seal means. Fluid is injected into the chamber to a pressure significantly greater than the internal pressure in the connection and any fluid inflow is instrumentally noted. The connection may be tested by initially making it up to engage an internal seal without engaging an external connection seal. Thereafter, the seal means are released and the connection is made up to full recommended torque and again tested. If the connection is leak proof, the seals are retracted and the tubular members may be lowered through the test unit into the well bore. If the test is initially conducted with the connection fully made up, the seals are retracted and the tubular members are run into the well bore, if the connection is leak free. If it leaks, the leak may be repaired, or the tubular members disconnected and replaced. In some instances the external test is conducted only after the initial seal has been established, and if it does not leak, the connection is released from between the seals, the connection fully made up and run into the well.

Other objects and advantages of the invention will become apparent from a consideration of the description and drawings.

BRIEF DESCRIPTION OF THE DRAWINGS

FIG. 3 is a longitudinal sectional view of another form of a leak tester of the present invention;

FIG. 5 is a partial sectional view showing the leak tester of the present invention wherein the seal means is seated on the upset of a tubular member;

FIG. 6 illustrates the leak tester of the present invention wherein the seal means is seated on the tubular member adjacent the upset portion thereof;

DESCRIPTION OF THE PREFERRED EMBODIMENTS

Figure 1:
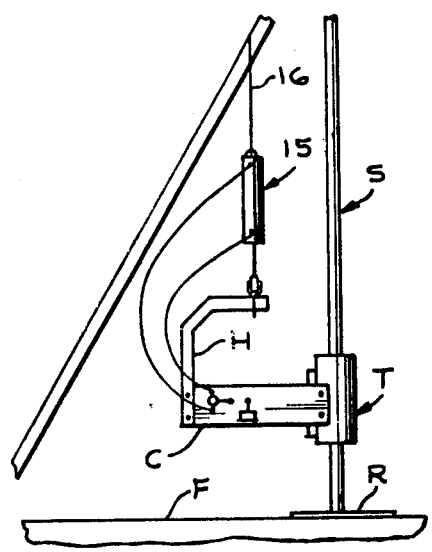
FIG. 1 is a schematic view illustrating the present invention supported on the floor of a well derrick or mast during the running of tubulars into a well bore.

In FIG. 1 a tubular well string is referred to generally by the letter S and the external leak tester of the present invention is referred to generally by the letter T and is shown as being supported for receiving the well string S longitudinally therethrough as shown in FIG. 1. Such support arrangement includes a housing or cabinet C adapted to house an air actuated hydraulic pump and means for supplying fluid to actuate the seals and for supplying fluid to externally test the connection in the external tester. The housing is connected to the hanger H that is supported by means of the double acting hydraulic cylinder referred to generally at 15 which hydraulic cylinder is suspended from a suitable means such as a cable 16 to position the tester T at a desired position adjacent the rotary table R in the well floor F to enable the well string pipe S to be moved longitudinally through the tester T and sequentially tested at each connection and then lowered into the well bore.

It can be appreciated that the present invention may be employed as a quality control check at a mill, as well as on site testing, or for rack testing at any location. It may also be used to test flow lines, pipe lines and flow conduits generally.

Figure 2:
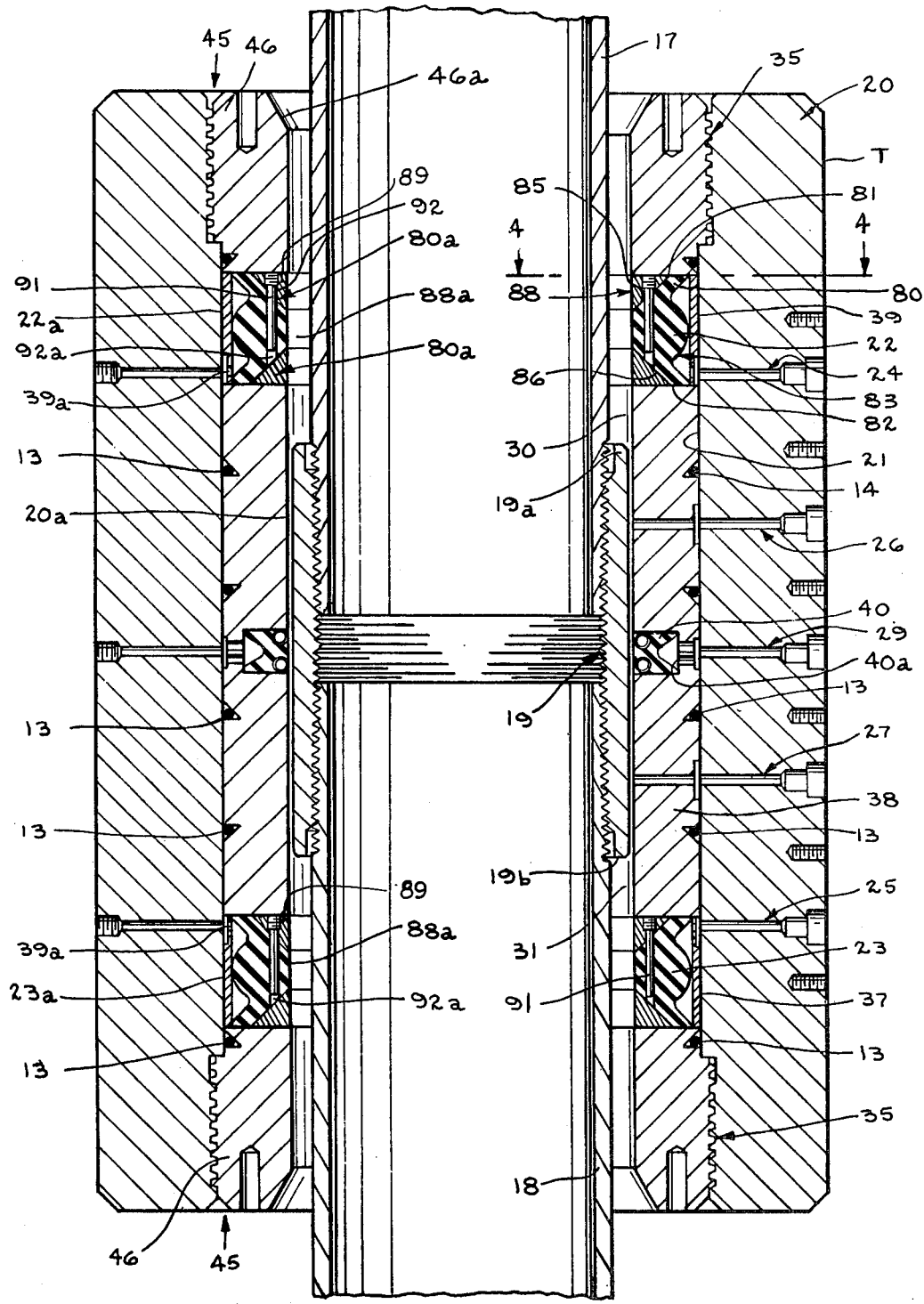
FIG. 2 is a longitudinal half sectional view of one form of the leak tester of the present invention.

In FIG. 2 the external tester T is shown as including a body referred to generally at 20 having an opening 21 extending longitudinally therethrough. The first and second annular seal means 22 and 23 are spaced longitudinally within the body opening 21 and are mounted in the body so that when fluid under pressure is supplied through the passage means 24 and 25 in the body 20 and through openings 39a in spacer 39 such seal means are urged into sealing engagement with the body and are moved radially of the body and the body opening 21 into sealing engagement with the tubular members 17 and 18 that are connected together by means of the connection referred to generally at 19. As illustrated in FIG. 2, the connection 19 is in the form of a collar which threadedly engages each end of the members 17 and 18 as shown. Such connection may be a weld or any other type of connection.

It is desirable that the annular seal means 22 and 23 when actuated by fluid pressure engage the tubular members 17 and 18 so as to seal off the coupling or connection 19 therebetween and form a chamber 20a between the seals. As shown in the drawings, the clearance between the coupling and chamber in the tester is maintained at a minimum so as to require a minimum volume of test fluid, whether hydraulic or pneumatic, thus increasing the sensitivity or accuracy of the tester.

This is accomplished by providing only a slight clearance for the coupling as it passes through the tester as shown in the drawings. Thus the opening in the body through which the connection and tubular members are received is only slightly larger in diameter than the connection to be tested.

Since the diameter of the chamber substantially throughout its extend between the seals is only slightly larger in diameter than the connection, the volume of the chamber is not substantially nor significantly greater than the volume defined by the external diameter of the connection and tubular members within the chamber. The test chamber volume is defined by the difference in volume between the chamber formed between the seals and the volume of the tubular members and connection within the chamber, and since the chamber volume preferably generally approximates the volume of the connection and tubular members retained between the seals, this increases the sensitivity of the tests. Also, fluid pressure in the test chamber will not act to increase the test chamber volume so as to affect the sensitivity or accuracy of the tests. Suitable fluid pressure may then be communicated through the passage means referred to generally at 26 and 27 to a pressure significantly greater than the pressure internally of the connection 19 to externally test the threaded connection between the tubular members 17 and 18 and coupling for leaks by detecting any fluid inflow to the interior of the coupling.

The body 20 of the tester T is shown in FIG. 2 as including additional annular seal means 40 for engaging the coupling forming the connection 19 in FIG. 2 of the drawings between the seal means 22 and 23. Additional fluid passage means referred to generally at 29 are provided in the body for communicating on one side of the additional seal means 40 to urge it radially outwardly to engage the coupling so as to isolate the end 19a of the coupling from the end 19b of the coupling and to separate chamber 20a into chambers 30 and 31.

If the pressure in the chamber 20a between seals 22 and 23 falls or reduces to indicate a leak, then additional seal means 40 is actuated to engage coupling 19. Thereafter, the connection 19 may be selectively externally leak tested to determine which end of the coupling may be leaking by instrumentally determining any pressure decay or fall off as a result of fluid inflow into the connection ends from the chamber 30 formed between the seal means 22 and the seal means 40 or from the chamber 31 formed between the seal means 23 and the seal means 40. Such pressure decay or fall off from either chamber to the interior of the tubular members 17 and 18 through the connection 19 may be noted visually or by any suitable instrument means such as a gage as will be noted in greater detail hereinafter.

The longitudinally extending body opening 21 is shown in FIG. 2 as being provided with connecting means 35 adjacent each end, such connecting means being shown as comprising threads. The body 20 includes a plurality of spacer means 37, 38 and 39 being ring shaped members having longitudinal openings therethrough and are adapted to be positioned within the longitudinally extending body opening 21 as shown and cooperate to form annular recesses 22a, 23a and 40a for receiving and positioning the seal means 22 and 23 in proper longitudinal spaced relationship in body 20 for receiving and sealing the connection 19 therebetween.

The annular recesses 22a, 23a and 40a in the body 20 enable the seal means 22, 23 and 40 to move freely radially relative to the body so as to sealingly engage with the tubular members 17 and 18 and to retract into their respective annular recesses when pressure is withdrawn or released from each of the seal means. The construction and arrangement of the seals and the manner of actuating them by fluid pressure enables the present invention to sealingly engage tubular members which may have some defect that would prevent proper sealing engagement by other types of sealing arrangements of the prior art.

Locking means referred to generally at 45 in FIG. 2 are provided in the form of threaded rings 46 for threadly engaging with the threads comprising the connecting means 35 to engage and retain the spacer means and seal means in position as illustrated within the body opening 21.

Figure 12:
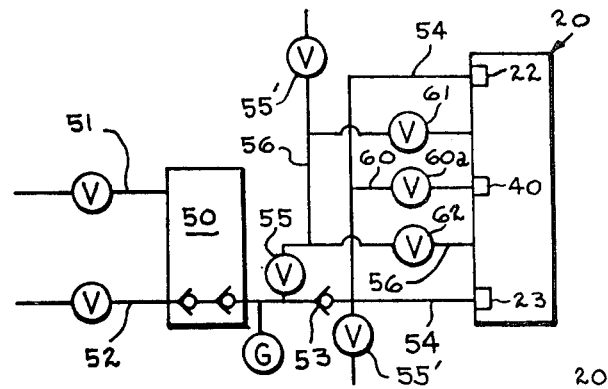
FIG. 12 is a diagrammatic view illustrating a test arrangement for use with the present invention.

It can be appreciated that various size openings in the spacer means may be provided to accommodate connected tubular members of various diameters within a predetermined range. When employing the tester of the present invention a suitable air or gas and fluid source, which fluid for purposes of illustration will be described as water, will ordinarily be available at the rig site. As shown in FIG. 12, an air actuated pump 50 is connected to a conduit 51 for supplying air to the air actuated hydraulic pump 50 whereupon fluid, such as water may be pumped through the pump and through the check valve means 53 in the line 54 to supply fluid to act behind or on one side of each of the seals 22 and 23. The fluid pressure sealingly engages the seals in their respective grooves as the seals simultaneously move radially to sealingly engage the tubular members. After the seals have been set, the valves 55 and 62 are opened whereupon pressure is conducted through the conduit 56 to the chamber 20a defined between the seal means 22 and 23 sealingly engaging the tubular members 17 and 18 on each side of the coupling shown in FIG. 2. The check valve 53 retains the pressure on seals 22 and 23 and the pressure in chamber 20a may be any amount desired up to collapse pressure rating of the connection and tubular members.

The conduits 54, 56 communicate with a gage designated G and when the valves 55, 62 in the conduit 56 are opened after the seals 22 and 23 have been set and chamber 20a between seals 22, 23 subjected to the desired fluid pressure, any pressure fall off in the chamber 20a defined between the seals 22 and 23 is instrumentally noted by gage G. This indicates a fluid inflow from such chamber to the interior of members 17 and 18 and a leak in connection 19. Thereafter the valve 60a may be opened and fluid pressure conducted through the conduit 60 to act on the seal 40 to engage such seal with the connection and isolate the coupling end 19a from the coupling end 19b shown in FIG. 2. Thereafter by selectively actuating the valves 61 and 62, it can be determined which or if both of the coupling ends are leaking by noting pressure fall off on gage G when valves 61 and 62 are opened one at a time to selectively communicate the chambers adjacent the coupling ends 19a, 19b with gage G. During the foregoing, valves 55' are closed and after the test is completed pressure on the seals and in the chambers is bled off by opening either of valves 55'.

Figure 16:
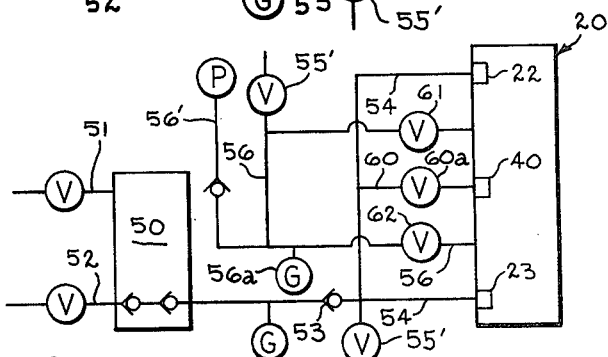
FIG. 16 is a diagrammatic view illustrating an alternate test arrangement with the present invention.

If it is desired to set seals 22, 23 and 40 with hydraulic pressure and test a joint or connection with pneumatic pressure such as nitrogen or the like, the arrangement of FIG. 16 may be employed. It is similar to FIG. 12, but a separate source for pneumatic pressure is pump P which discharges to the test chamber through lines 56' and 56 with any fall off due to leakage in the joint being registered by gage 56a in line 56.

When the test is completed hydraulic seal pressure may be bled through valve 55' in line 54 and pneumatic chamber test pressure bled through valve 55' in line 56.

Figure 13:
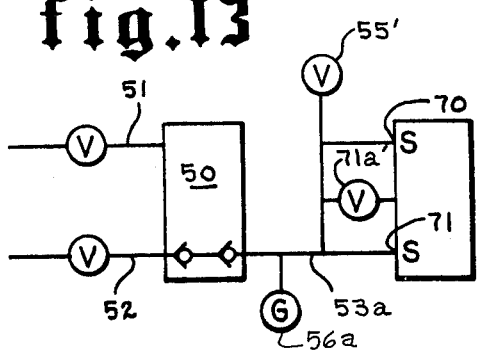
FIG. 13 is a schematic diagram illustrating the use of the form of the invention shown in FIG. 3 for testing tubulars.

A pneumatic source may be supplied to the test chamber in the FIG. 13 system by disconnecting valve 71a' from the hydraulic system and connecting it to communicate with a pump source P as in FIG. 16. The hydraulic lines may be employed to set seals 70 and 71, or the seals 22, 23 (as the case may be). A gage 56a in the pneumatic line could be employed to detect joint leakage. The valve 55' in FIG. 13 may be opened to bleed pressure from the seals and similar valve in the pneumatic line may be opened to bleed the test chamber when the test is completed.

FIG. 2 illustrates a nonupset coupling type coupling connection, and in FIG. 3 a tester T suitable for use with what may be termed a premium joint such as that referred to as a "Hydril" or an "Atlas Bradford" connection is shown. A schematic illustration of the latter is illustrated, however it can be appreciated that the present invention will function equally well on any type of premium connection. In this form of the invention the tester T again includes an annular body 20 with a longitudinally extending body opening 21 therethrough. One end of the opening 21 is provided with an annular shoulder 65 as illustrated for receiving and seating spacer means 66 thereon. The spacer means 66 includes an annular lip 66a and spacer means 68 includes annular lip 68a and these spacers along with the spacer means 67, when properly positioned, provide spaced annular recesses 70a and 71a for receiving the seal means referred to at 70 and 71. After the spacers and seal means have been positioned within the body, a threaded ring 46 may be threadedly engaged with the connecting means 35 shown again as being in the form of threads adjacent one end of the longitudinal opening 21. The spacers may be considered as forming part of the body 20, as in the FIG. 2 modification.

The tubular members 17a and 18b illustrated in FIG. 3 of the drawings are shown as having what is termed in the art an upset, and it will be noted that the seal means 70 and 71 seal on such upsets to isolate the connection therebetween.

After the tubular members have been positioned longitudinally in the opening, fluid pressure is supplied through the passage means 72 and 73 to move the seal means 70 and 71 radially of the body into sealing engagement with the upset portions of the tubular members 17a and 18b to isolate the connection therebetween and form a chamber 20a between seals 70 and 71. Thereafter external fluid pressure may be conducted through the passage means 74 between the seal means 72 and 73 to chamber 20a and the pressure increased to the desired amount to determine whether or not there is a leak in the connection between the tubular members 17a and 18b.

This arrangement is schematically illustrated in FIG. 13 wherein an air actuated hydraulic pump 50 is again represented. Air from line 51 actuates the pump and pumps fluid, which in this illustration is water, from conduit 52 to line 53a to close seals 70 and 71. Thereafter valve 71a' may be opened to communicate test fluid to chamber 20a between seals 70 and 71. Any fall off of pressure in chamber 20a will be instrumentally measured on gage G. The pressure on the seals and in the chamber may be bled off through valve 55' when the test is completed.

In FIG. 5 the form of the invention as illustrated in FIG. 2 is shown as being employed with tubular members wherein the tubular member such as that shown at 18c is provided with an annular upset portion 18d and the connection 19 is shown as being in the form of a coupling 19a'. The seals engage the coupled, upset pipe of FIG. 5. In FIG. 6 the tubular member 18c is again shown and it will be noted that the seal means is shown as sealingly engaging the tubular member below the upset portion 18d.

In the FIG. 2 as well as in the FIG. 3 form of the invention, after the external pressure test has been conducted, pressure is relieved from the seals whereupon they withdraw radially away from the tubular members and enable the tubular members, regardless of the form of connection, to be moved longitudinally through the tester 20 and into the well bore.

The test of the present invention may be conducted when the connection is only partially made up. For example, the connection shown in FIG. 3 includes an internal and an external seal. The connection may be made up with only the internal seal engaged, and the seal means then radially moved to seal it off for test. The seals may then be released, the connection made up to full recommended torque and the seal means again radially moved to isolate the connection for an external test. If the joint leaks, it can be repaired or disconnected and replaced. In some instances, the joint will be tested when only the initial seal is established and if it does not leak, it is fully made up and run into the well bore.

After the test, the seals are withdrawn radially and the tubular members may be lowered into the well bore.

This same procedure may be applied on any connection, including the coupling 19 shown in FIG. 2.

It can be appreciated that the external pressure test conducted on the connection is conducted at relative high pressures (i.e. up to at least collapse pressure rating of the connection and tubular members if desired) and the seal means employed must be capable of withstanding such test pressures to maintain a seal to determine the integrity of the connection and also must be capable of withdrawing into the recesses so as to enable the tubular members to move therethrough of the connection. Ordinarily, the pressure internally of the connection will be approximately atmospheric.

Figure 4:
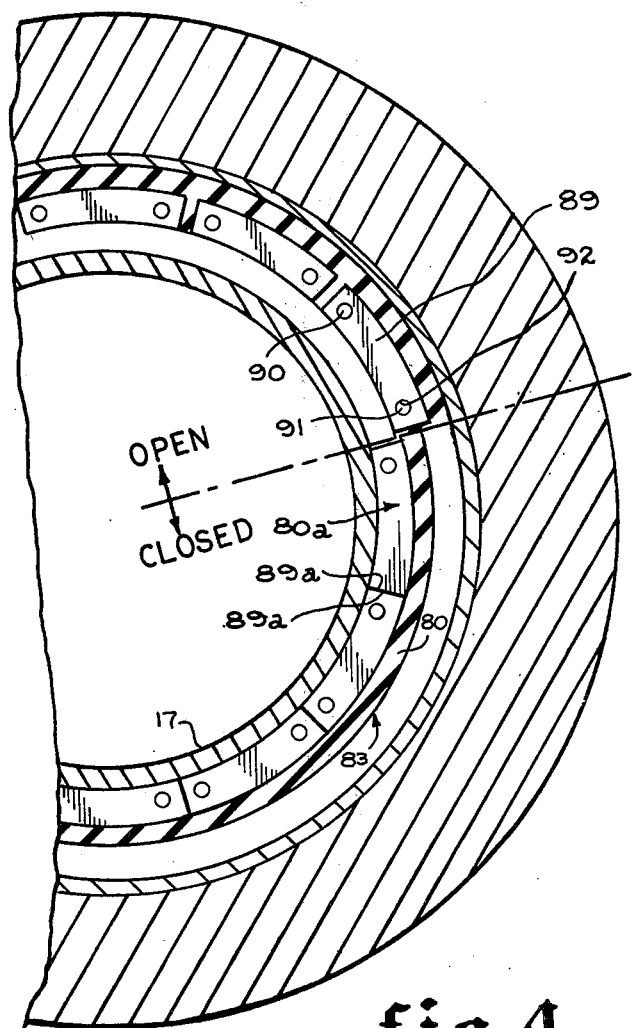
FIG. 4 is a sectional view on the line 4—4 of FIG. 2 and showing the relative position of the seal and back up means both during nonsealing and sealing engagement with a tubular member.

Attention is directed to FIGS. 2 and 4 wherein one form of seal means is shown as including an annular elastomer body 80 having surfaces 81 and 82 which extend generally toward the tubular member to be sealingly engaged. A circumferential surface 83 extending therebetween is adapted to receive fluid pressure thereagainst and the surfaces 81 and 82 each include portions 85 and 86 which are inclined toward each other as shown better in FIG. 2. Thus, the annular inner edge portions 88a and 97a (FIG. 3) of the seal means of the present invention have a smaller cross sectional area adjacent the tubular members they engage than the cross sectional area of surface 83 or 97 (FIG. 3) against which the fluid pressure is applied as shown in the drawings. This increases the pressure per unit area where the seals engage the tubular members and creates a more effective seal.

The surface portions 85 and 86 have mounted thereon back up means referred to generally at 80a and in FIG. 4., such back up means is shown as comprising a plurality of arcuate or annular rigid segments 89 which are preferably generally triangular in cross section as shown in FIG. 2 of the drawings. The annular or arcuate segments 89 are each mounted on the surfaces 85 and 86 by any suitable means such as pins 90 and 91 which pins are secured to the segments by any suitable means such as threads thereon which engage with threads formed in openings 92 in the segments as shown in the drawings. Openings 92a are provided in the elastomer or seals to receive the pins and thus the segments 89 are arranged on the top and bottom circumferential edges of the body 80 adjacent the longitudinal opening therethrough. If desired the segments 89 on the surface portion 85 may be offset circumferentially from the segments 89 on the surface portion 86 to further inhibit extrusion of the elastomer seal. It will be noted that the pins and openings are provided in both the upper and lower rows of segments, but for simplicity in illustration the pins are shown only in the upper segments. When the elastomer body 80 is moved into sealing engagement with the tubular member, the segments 89 provide backup and inhibit extrusion of the elastomer.

As shown in FIG. 4, the annular segments 89 are arranged on the body 80 in circumferential spaced relation when the seal is retracted into the recess, but as the fluid pressure moves the body 80 toward sealing engagement, the segments 89 contact as shown at their edges 89a. When the pressure on edge 83 is released, the elastomer returns to its original position in its recess.

Figure 7:
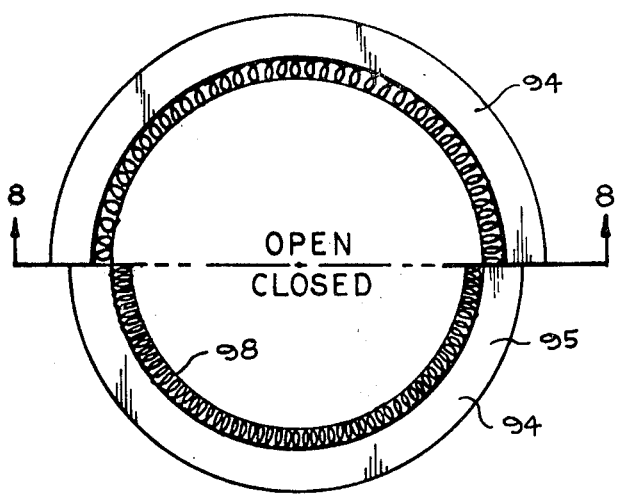
FIG. 7 is an elevational view of one form of seal means usable with the present invention.
Figure 8:
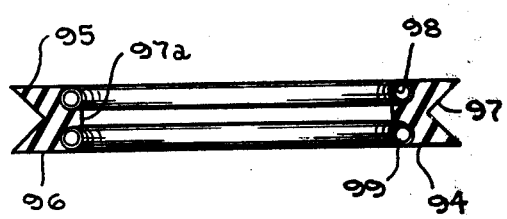
FIG. 8 is a sectional view on the line 8—8 of FIG. 7 to better illustrate the details of the seal means.

The seal means 22 and 23 may assume that form as shown at 40 in FIG. 2. As shown in FIGS. 7 and 8 this seal form comprises an annular elastomer body 94 having upper and lower surfaces 95 and 96 which are substantially parallel and extending toward the connection or tubular member to be sealingly engaged. They are joined by a circumferential edge 97 extending therebetween against which fluid pressure may act. A pair of garter springs 98 and 99 are mounted in each of the surfaces 95, 96 at the juncture of the surfaces 95, 96 and the longitudinal opening in the seal which is the edge nearest the connection or tubular member to be sealingly engaged. The garter springs collapse when the seal is closed to aid in inhibiting extrusion of elastomer upon the application of pressure as shown in FIG. 7. Similarly such garter springs aid in returning the annular seal means to its withdrawn position relative to the tubular member or connection to which it is to be sealingly engaged so that such members may be moved longitudinally therethrough. As shown in FIG. 7, the coils of the garter springs are in their normal spaced relationship when the seal is "open" and are collapsed when the seal is "closed" about the connection.

The elastomer for the seals may be any suitable material and polyurethane has been found to work quite satisfactorily. It is of suitable hardness to withstand extrusion under pressure and resilient enough to return the seal into the recess when pressure is released. The circumferential edge 83 and the circumferential edge 97 of each form of seal means is provided with annular lips at its top and bottom surfaces as shown in the drawings so that when fluid pressure is exerted directly against such circumferential edge, the lips sealingly engage the recess as the seal simultaneously moves radially to sealingly engage the pipe. Also, each seal includes an annular portion 88a and 97a between the back-up means of reduced cross section as previously noted for sealingly engaging the pipe.

In the form of seal means shown at 22, 23, a substantial volume of polyurethane or enlargement is provided along edge 83 to aid in returning this seal form into the recess and to reduce the fluid volume required to actuate the seals.

It can be appreciated that suitable seal means as referred to at 13 in the drawings are provided between the body 20 and the annular spacer rings positioned in the opening 21 of such body and the threaded nuts so as to inhibit any loss of fluid pressure.

FIGS. 9, 9A, 10 and 11 show a slightly modified arrangement to enable the present invention to be used as a quality control check at a mill or for conducting external tests at any location.

Figure 9:
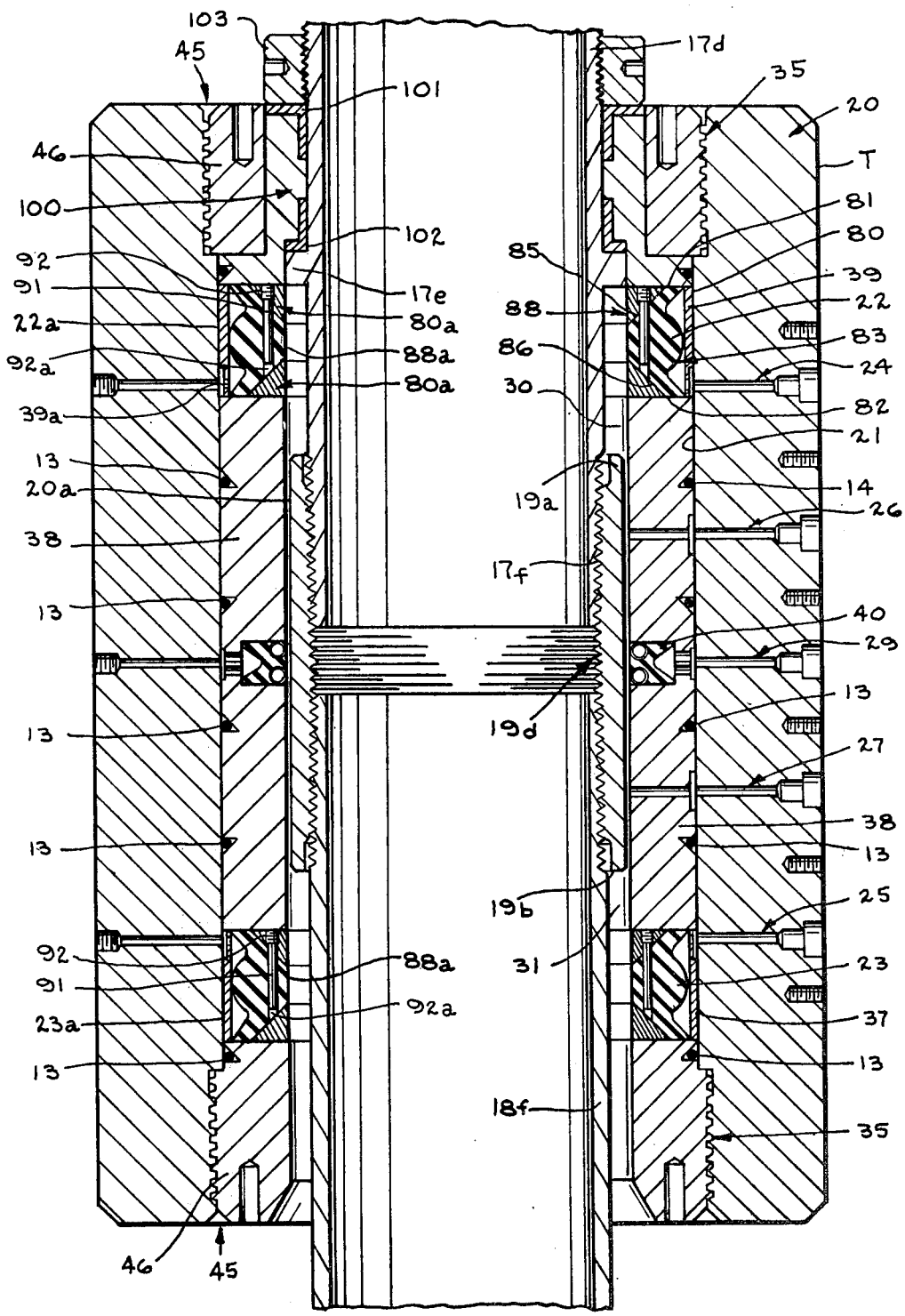
FIG. 9 illustrates a modified form of the device for use on location or for use at a mill for quality control.

FIG. 9 is similar to FIG. 2, but shows a tubular portion or one tubular member 17d having an annular enlargement 17e thereon. The locking means 45 is also modified.

An annular adapter and bushing arrangement referred to generally at 100 includes brass sleeves 101 and 102 mounted on an annular removable member, and this annular member includes a shoulder for receiving ring nut 46 thereon as shown in FIG. 9. Brass bushing 102 abuts the annular enlargement 17e as shown. A nut 103 threadedly engages tubular portion 17d, after nut 46 has been threadedly engaged in threads 35. Thus the portion 17d is locked against longitudinal movement by this arrangement, however it is rotatably supported in body 20.

The tubular portion 18f with a coupling 19d threaded thereon may be inserted in the tester T and tubular portion 17d rotated to engage the coupling 19d either partially or fully made up as desired. Thereafter the tests described hereinbefore may be conducted to test the thread in coupling 19d. It can be appreciated that the threaded portion 17f on 17d has been formed in a manner well known to conform with a thread gage and thus serves as a gage for the threads in the coupling with which it is engaged.

Figure 9A:
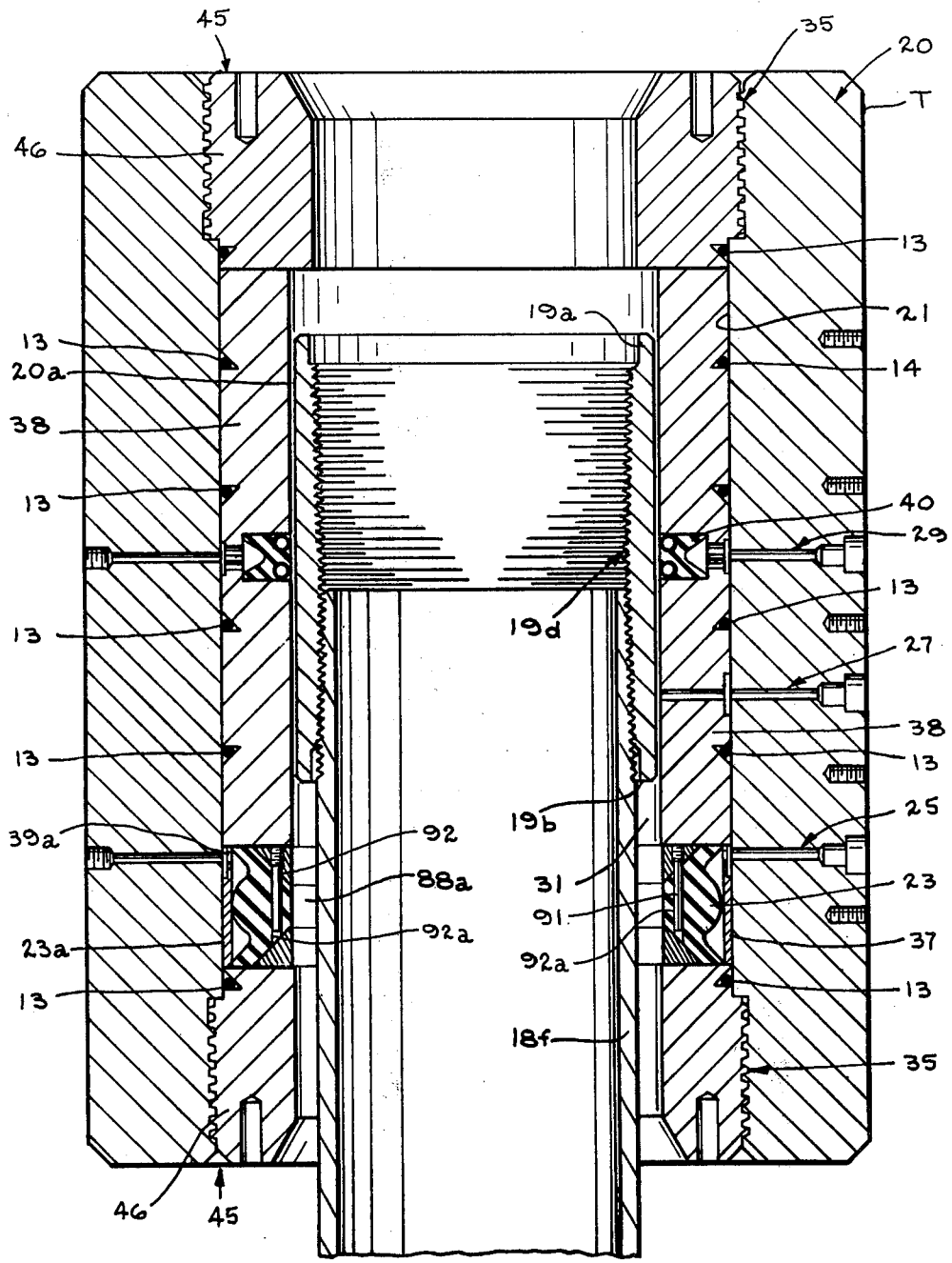
FIG. 9A is another modified form of the invention.

FIG. 9A is a modification of FIG. 9 for testing between a connection and a tubular member. In FIG. 9A, the tubular portion 18f with a coupling 19d threaded thereon is inserted in tester T. Thereafter seal means 40 is actuated to engage the coupling 19d and seal means 23 is actuated to engage the tubular portion 18f. Pressure may then be conducted through passage 27 to externally test between coupling or connection 19d and tubular portion 18f. While a coupling 19d is shown as being threadedly connected to tubular portion 18f, the coupling or any other form of connection may be secured with tubular portion 18f in any other suitable manner such as by welding. Nuts 45 retain the seal means and spacer means in position in body 20 and serve as a stop for coupling 19d and tubular portion 18f when they are inserted in the tester T.

Figure 10:
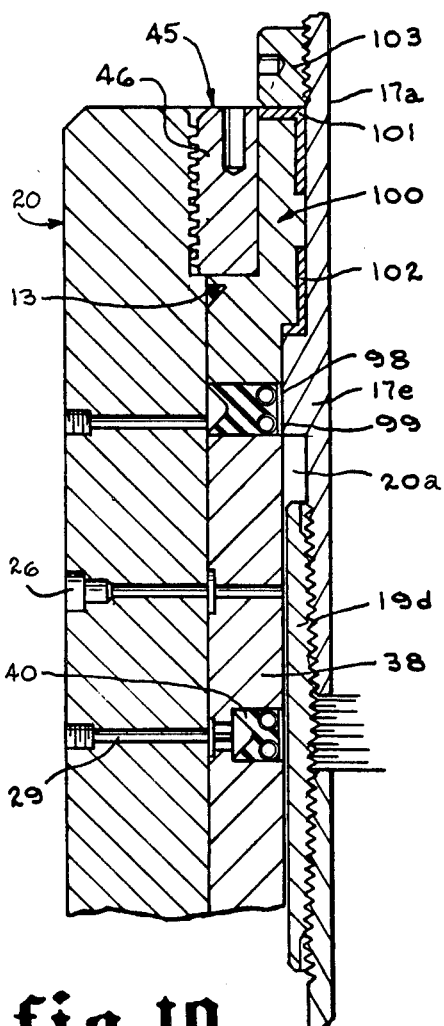
FIG. 10 is a partial sectional view illustrating an alternate embodiment of FIG. 9.

FIG. 10 is similar to FIG. 9, but shows the enlargement 17e as being longer for use with the form of seal means wherein garter springs 98, 99 serve as the back up means for the seal means.

Figure 11:
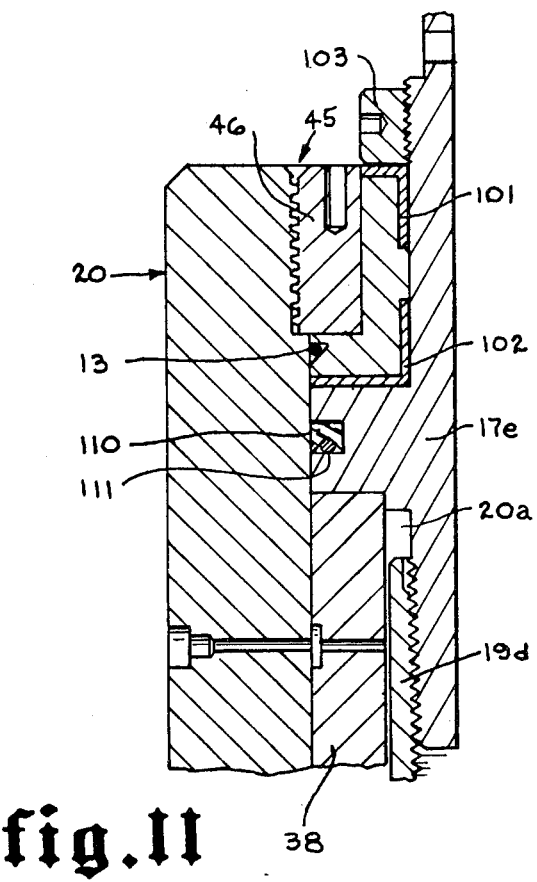
FIG. 11 is a partial sectional view illustrating another embodiment of FIG. 9.

FIG. 11 shows still another arrangement wherein a seal means 110 in the form of an annular generally U-shaped member is provided with an O-ring 111 therein. It faces in the direction of the chamber 20a so that when pressure exists therein seal means 110 is actuated.

The operation and function of the FIGS. 10 and 11 form is similar to that described with regard to FIG. 9.

By applying pressure directly on the seal means adjacent one circumferential edge to move the seal means radially into sealing engagement, a number of objections of prior devices and methods is overcome by the present invention. Also, the present invention enables a much smaller volume of fluid to be employed to run the tests, so that the tests are more sensitive and accurate in uncovering leaks. It can be appreciated that the spacer means are provided with passage or port means to communicate fluid pressure to the seal means and the test chambers, as shown and described. The spacer means may be considered as part of the body means.

The configuration of the seal means enables the seal means to sealingly engage the recesses in which they are seated as such seal means moves radially to sealingly engage about the connection to be tested. Also since the size of test chamber can be determined by the inner diameter of the spacer means or by the body bore diameter if spacer means are not employed in the body, a test chamber of minimum volume in relation to the volume of the connection and tubular members may be provided thus providing a more sensitive and accurate test.

The seal means when in relaxed position are withdrawn from the body bore 21 into the body 20. As shown, they are illustrated as being flush with the bore through which the tubular members and connection are received; however they may be constructed so as to be retracted relative to the bore to prevent damage thereto as the connection and tubular members are moved through the tester T, or the tester T moved relative to the tubular member. Also, the reduced cross sectional area of the seal means at the sealing end adjacent the bore lessens the possibility of damage to the seals, and the back-up means provides further protection.

The present invention has been described wherein the pressure test is conducted by hydrostatic means; however, it can be appreciated that suitable gas pressure such as nitrogen or other compressible medium may be employed to set the seals and conduct the test in those circumstances where desired.

It can be appreciated that either the double garter spring seals as shown at 70 and 71 (FIG. 3) or the seal means 22, 23 (FIG. 2) may be employed and interchanged when desirable or necessary in the tester of the present invention.

Figure 14:
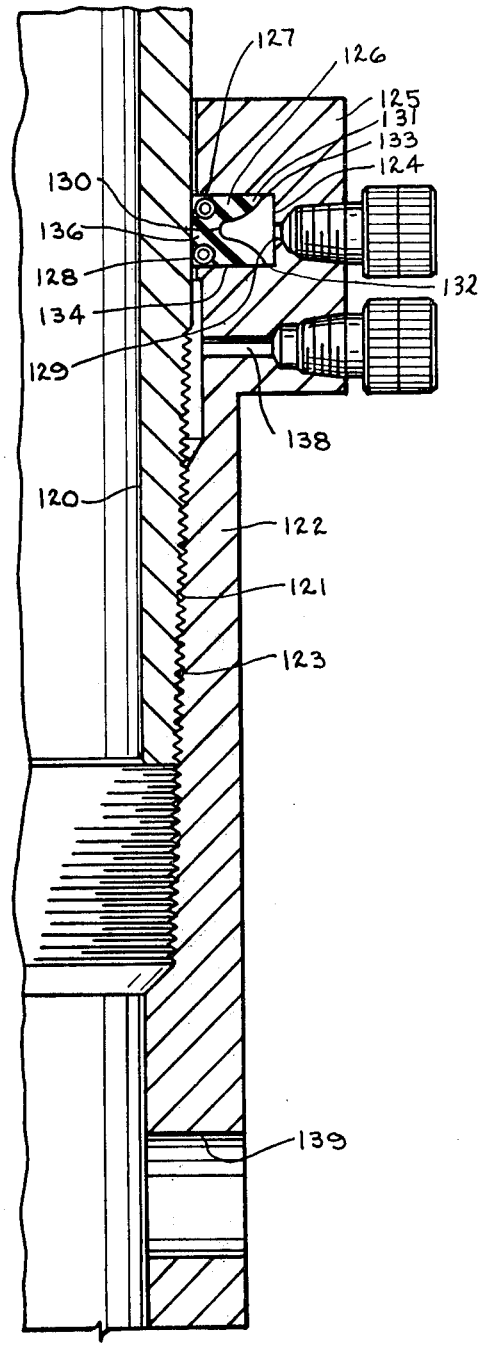
FIG. 14 is a fragmentary sectional view illustrating a modified form of tester.

In FIG. 14, a tubular member 120 is shown having threads 121 thereon. This is normally termed the "pin end" of a tubular member. Suitable means for testing threads 121 are shown in the form of an annular body 122 having threads 123 adjacent the end thereof. It can be appreciated that only a fragmentary sectional view of body 122 is shown as is a fragmentary section view of tubular member 120. Suitable openings as shown at 139 are provided to rotate body 122 onto member 120.

An annular groove 124 is positioned in the annular enlargement 125 on body 122, and an annular seal 126 is carried in the groove 124. The annular seal means 126 includes the garter springs 127 and 128 and is constructed similar to the seals 70 and 71 shown and described in FIG. 3. It is formed of a suitable elastomer such as polyurethane.

Passage means 129 are provided for conducting fluid to seal means 126 to act on circumferential edge 130 and expand lips 131 and 132 into sealing engagement with side walls 133 and 134 of groove 124 and to move annular edge 136 into sealing engagement with tubular member 120.

Fluid pressure to test threads 121 is supplied through passage 138.

It can be appreciated that the tubular member 120 and body 122 may be made up a predetermined amount and the pressure applied externally to test threads 121 can be in any amount desired up to collapse pressure rating of the tubular member 120. The threads 123 on body 122 serve as a control or gage to determine, when the threads 121 are externally tested as described, if they are correctly cut or formed on tubular member 120.

Figure 15:
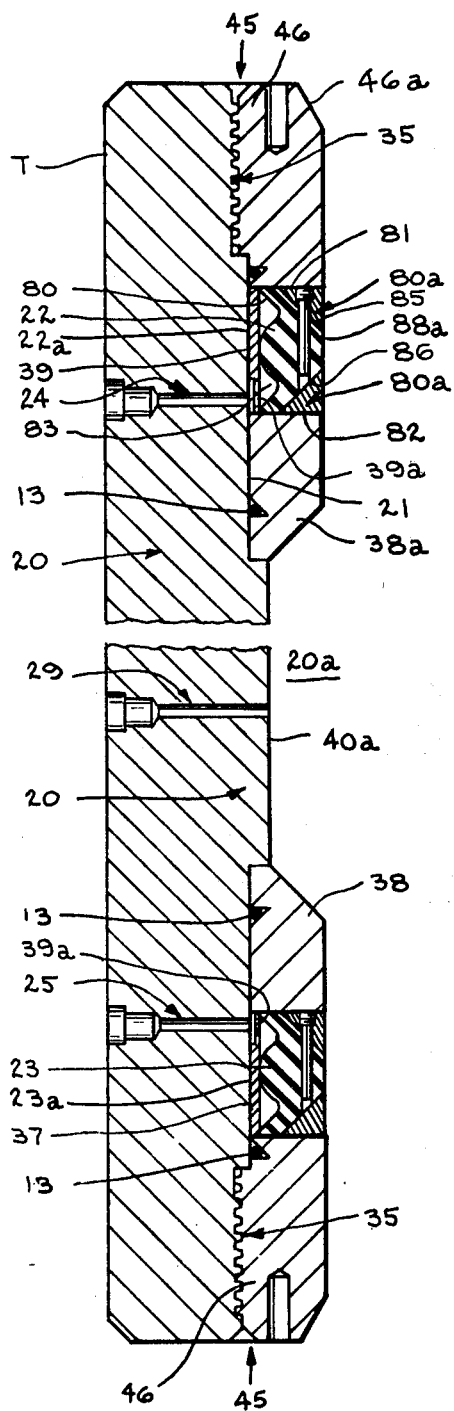
FIG. 15 is a broken partial sectional view showing still another form of tester.

In FIG. 15, a form of tester is shown which has an elongated body 20 which is similar to body 20 in FIG. 2. Like numerals are applied in FIG. 15 to identify like parts of FIG. 2. It will be noted that the central spacer 38 is formed in two spacers 38 and 38a to act as support for seal means 22 and 23 and form annular recesses in the body 20.

Passage 29 serves to supply fluid pressure to the chamber formed between seals 22, 23 since seal 40 is omitted from the FIG. 15 form.

The body 20 in the FIG. 15 form may be of any desired length to test flow couplings, seating nipples, circulating sleeves, mandrels and other accessory combinations used in tubular strings. If desired, body 20 could be long enough to test one or more lengths of tubular members for collapse strength.

The form of tester shown in FIG. 15 as well as that shown in FIG. 3 could be employed to test welded connections in pipe lines or other connections in other flow conduits.

The present invention can also be employed on pipe laying barges to test pipe lines after welding and before positioning them in the ground or in water covered areas.

The nut or ring 46 as shown in FIG. 2 and FIG. 3 is provided with an annular taper 46a, adjacent the central opening in the ring 46. In the FIG. 3 form the spacer adjacent the ring 46 is also provided with an annular taper 68a'. Thus the present invention forms a stabbing guide as the pipe is run in the well bore.

For example, the body 20 may be positioned so that the box end (female end) of each length of pipe is received therein as illustrated in FIGS. 2 and 3. Then, the pin end of the next pipe length is lowered into body 20 and rotated to connect the pin and box together. Since the body 20 is already on the pipe and positioned properly relative to the connection, the testing of the connection can proceed as soon as the two pipe lengths are connected the desired amount and the pipe string run into the well bore. This operation is repeated until the pipe string is completed.

As the pin end (male end) is lowered into body 20, sloping surface 46a acts as a stabbing guide, guiding the pin end into mating relationship with the upstanding box.

The foregoing disclosure and description of the invention are illustrative and explanatory thereof, and various changes in the size, shape, and materials as well as in the details of the illustrated construction may be made without departing from the spirit of the invention.

What is claimed is:

1. A testing apparatus for externally testing a connection means between tubular members comprising:

A body having longitudinal opening through which said tubular members and connection may extend;

removable spacer means positioned in the wall of the body opening in stationary relationship and having an opening of preselected size extending longitudinally therethrough and providing longitudinally spaced annular grooves;

radially movable first and second annular seal means positioned in the grooves formed by the spacer means and disposed on opposite sides of the connection;

back-up means mounted on said first and second annular seal means and movable radially therewith for engaging the tubular members;

said body having passage means therein for conducting a pressurized actuating fluid to move said seal means and back-up means radially inwardly of said body to seal against the tubular members and seal off the connection between said seal means;

said body having additional passage means for conducting a pressurized test fluid to externally test the connection means sealed off between said seal means;

means to secure said stationary spacer means and seal means in the body opening;

means for detecting pressure decline of the test fluid to thereby indicate leakage past the connection;

one of said tubular members including an annular enlargement thereon;

bearing means in the body opening for the tubular member;

means carried by said body to retain said bearing in position; and removable means carried by the tubular member which cooperate with said enlargement and bearing means to inhibit longitudinal movement of the tubular member.

2. In a testing apparatus for externally testing connection means between tubular members comprising:
a body having a longitudinal opening through which said tubular members and connection may extend;
removable spacer means positioned in the wall of the body opening in stationary relationship and having an opening of preselected size extending longitudinally therethrough and providing longitudinally spaced annular grooves;
radially movable first and second annular seal means positioned in the grooves formed by the spacer means and disposed on opposite sides of the connection;
back-up means mounted on said first and second annular seal means and movable radially therewith for engaging the tubular members;
said body having passage means therein for conducting a pressurized actuating fluid to move said seal means and back-up means radially inwardly of said body to seal against the tubular members and seal off the connection between said seal means;
said body having additional passage means for conducting a pressurized test fluid to externally test the connection means sealed off between said seal means;
means to secure said stationary spacer means and seal means in the body opening;
means for detecting pressure decline of the test fluid to thereby indicate leakage past the connection;
an additional annular seal means to engage the connection means which is positioned in the spacer means intermediate said first and second seal means;
said body having passage means for conducting fluid to move said additional annular seal means into engagement with the connection means to isolate each end thereof and also having additional passage means for communicating on each side of said additional annular seal means whereby each end of the connection means may be separately tested externally by pressurized fluid for leaks;
one of said tubular members including an annular enlargement thereon;
bearing means on the body opening for the tubular member;
means carried by said body to retain said bearing in position; and
removable means carried by the tubular member which cooperate with said enlargement and bearing means to inhibit longitudinal movement of the tubular member.

3. The testing apparatus set forth in claim 2 wherein said first and second annular seal means includes:
an annular elastomer body having surfaces extending toward the tubular members to be engaged by said seal means; and
said back-up means being carried by said surfaces on said elastomer body on the surface portions nearest the tubular member to be tested to prevent extrusion of said elastomer body when sealingly engaged with the tubular members during external testing of the connection.

4. The testing apparatus set forth in claim 2, wherein said first and second annular seal means includes:
an annular elastomer body having surfaces extending toward the tubular members to be engaged by said seal means; and
said back-up means being carried by said surfaces on said elastomer body on the surface portions nearest the tubular member to be tested to inhibit extrusion of said elastomer body when sealingly engaged with the tubular members during external testing of the connection.

5. The testing apparatus as set forth in claim 2, wherein
each back-up means and its associated seal means have inclined surface portions engaged with and co-acting with each other to move said back-up means into tighter frictional contact after the seal means has engaged the tubular member; and
each back-up means being formed of a plurality of arcuate segments mounted thereon.

6. The testing apparatus as set forth in claim 2 wherein said additional annular seal means comprises:
an annular elastomer body having surfaces extending toward the tubular members to be engaged by said additional seal means; and
back-up means in the form of garter springs carried by said surfaces of said elastomer body adjacent the edges nearest the connection to be engaged to inhibit extrusion of said elastomer body when sealingly engaged with the connection, said garter springs aiding in retracting said seal means when fluid pressure is removed therefrom.

* * * * *